United States Patent [19]

Huber et al.

[11] Patent Number: 6,009,361
[45] Date of Patent: Dec. 28, 1999

[54] METHOD FOR THE RECOGNITION OF OIL TOP-UP QUANTITIES

[75] Inventors: Bernd Huber, Schorndorf; Juergen Pilsl, Altdorf, both of Germany

[73] Assignee: DaimlerChrysler AG, Stuttgart, Germany

[21] Appl. No.: 08/912,619

[22] Filed: Aug. 18, 1997

[30] Foreign Application Priority Data

Aug. 17, 1996 [DE] Germany ............... 196 33 189

[51] Int. Cl.⁶ ..................... G06F 7/70; G01L 3/26
[52] U.S. Cl. .................. 701/29; 701/30; 73/117.3; 73/116; 340/457.4; 123/196 S; 123/198 D
[58] Field of Search ................. 701/29, 30, 31; 73/53.05, 117.3, 116, 291, 302, 293; 123/196 AB, 142.5 R, 73 AD, 198 D, 196 S; 340/457.4, 438, 439, 459, 449

[56] References Cited

U.S. PATENT DOCUMENTS

| | | | |
|---|---|---|---|
| 4,329,952 | 5/1982 | Buraas | 123/196 AB |
| 4,677,847 | 7/1987 | Sawatari et al. | 73/53.05 |
| 4,862,393 | 8/1989 | Reid et al. | 701/30 |
| 5,056,017 | 10/1991 | McGarvey | 705/28 |
| 5,060,156 | 10/1991 | Vajgart et al. | 701/30 |
| 5,382,942 | 1/1995 | Raffa et al. | 701/30 |
| 5,530,647 | 6/1996 | Sem et al. | 701/30 |
| 5,749,339 | 5/1998 | Graham et al. | 123/73 AD |

FOREIGN PATENT DOCUMENTS

| | | |
|---|---|---|
| 0 339 003 | 10/1989 | European Pat. Off. |
| 0 515 326 | 11/1992 | European Pat. Off. |
| 0 786 584 | 7/1997 | European Pat. Off. |
| 37 42 783 | 6/1989 | Germany |
| 39 26 207 | 2/1991 | Germany |
| 41 18 896 | 12/1992 | Germany |
| 42 04 502 | 8/1993 | Germany |
| 44 29 234 | 8/1995 | Germany |

*Primary Examiner*—Jacques H. Louis-Jacques
*Attorney, Agent, or Firm*—Evenson, McKeown, Edwards & Lenahan, PLLC

[57] ABSTRACT

A method for recognizing oil top-up quantities is provided. The method records a multiplicity of oil levels under specific operating conditions over time; calculates an oil-mass average value $\bar{X}_z$ of the oil top-up quantity over z instantaneous measurements xmom in each case; calculates a compensating function describing the variation in an oil mass xh over time using a specific number of hourly oil masses xh; calculates a difference DFA from an end point xlang of the compensating function and from the penultimate oil-mass average value according to a function activates a discrimination function for checking whether the difference DFA is greater than a first oil-mass limit value M1; and if so, a special case is recognized and a processing function for calculating the oil top-up quantity in the special case is started; and if not, a further discrimination function is started, for checking whether the difference DFA is greater than a second oil-mass limit value M2 and there is a specific communication signal between the vehicle and driver. If the result of the check is that the difference DFA is greater than the second oil-mass limit value M2, a special case is recognized and the processing function for calculating the oil top-up quantity in the special case is started. If the interrogation result is negative, a processing function for calculating the oil top-up quantity in the normal case is activated.

17 Claims, 4 Drawing Sheets

| VARIABLE | MEANING | DATA (USING THE EXAMPLE OF THE OIL MASS IN KG) |
|---|---|---|
| M1 | CHECK FOR CASE DISCRIMINATION | 0.4 |
| M2 | CHECK FOR CASE DISCRIMINATION WITH ADDITIONAL CONDITION | 0.2 |
| M3 | STATISTICAL LIMIT VALUE FOR DESCRIBING THE SPREAD FOR ESTABLISHING THE CORRECT CALCULATION TIME POINT | 0.18 |
| M4 | PLAUSIBILITY LIMIT | 0.55 |
| M5 | PLAUSIBILITY LIMIT | 0.44 |

FIG. 4

METHOD FOR THE RECOGNITION OF OIL TOP-UP QUANTITIES

BACKGROUND AND SUMMARY OF THE INVENTION

The invention relates to a method of determining oil top-up quantities for an engine.

German Patent document DE 44 29 234 A1 discloses a method of determining the oil consumption of an engine in a vehicle by using a measuring and switching device arranged in the oil sump of the engine. The measuring and switching device determines specific state values of the oil and whether the oil has fallen below a preset level. In this case, the particular state values, the most important engine operating variables and the geometry of the oil sump are taken into account, in order to determine the oil consumption per unit of distance with reference to a distance covered.

Problems which arise in this case are that, as a rule, these measurements work only in an unreliable manner on account of the high dynamics of the oil level. As a result, these measurements may lead to incorrect results due to particular vehicle states, such as, for example, an unlevel position of the vehicle and high acceleration values.

The object of this invention is to overcome the above-described disadvantages of the prior art by providing a possibility of recognition, in order to detect an intermediate oil top-up quantity and to determine its size.

The object is achieved by a method for recognizing oil top-up quantities. The method records a multiplicity of oil levels under specific operating conditions over time; calculates an oil-mass average value $\overline{X}_z$ of the oil top-up quantity over z instantaneous measurements xmom in each case; calculates a compensating function describing the variation in an oil mass xh over time by means of a specific number of hourly oil masses xh; calculates a difference DFA from an end point xlang of the compensating function describing the variation in an oil mass xh over time and from the penultimate oil-mass average value according to the function (DFA=xlang-$\overline{X}_{zN-1}$) with $\overline{X}_{zN-1}$ being the oil mass penultimately obtained by rolling or weighing averaging from z instantaneous oil masses xmom; activates a discrimination function for checking whether the difference DFA is greater than a first oil-mass limit value M1; and if so, a special case is recognized and a processing function for calculating the oil top-up quantity in the special case is started; and if not, a further discrimination function is started, for checking whether the difference DFA is greater than a second oil-mass limit value M2 and there is a specific communication signal between the vehicle and driver. If the result of the check is that the difference DFA is greater than the second oil-mass limit value M2 and there is a specific communication signal between the vehicle and driver, the method recognizes a special case and the processing function for calculating the oil top-up quantity in the special case is started, if the interrogation result is negative, a processing function for calculating the oil top-up quantity in the normal case is activated.

The present invention accordingly recognizes the following:

Oil top-ups change the oil level in the oil sump. For the reliable calculation of oil consumption, therefore, each top-up of oil must be recognized. The objective for improving oil consumption measurements is consequently the recognition of top-ups in commercially available containers. It must be possible to detect oil quantities of an order of magnitude from 0.5 l with an accuracy of below±0.25 l.

Moreover, the recognition of oil top-up quantities can be used in methods of solution which draw conclusions as to quality or as to a lengthening of the oil-change interval from the determination of the oil top-up quantity and, if appropriate, the topping-up time.

By means of this method and the associated recognition of special cases, it is advantageously possible to go further and differentiate engine damage in terms of the degree of damage.

By setting limits or limit values and evaluating the changing difference between the current $\overline{X}_z$ values, which correspond to the slope of a straight line, it is possible, for example in the case of serious engine damage, to recommend the driver to visit a workshop immediately, in order to protect the engine from even worse damage or destruction, for example due to piston seizure.

At the same time, "creeping" engine damage can thereby also be recognized during a routine inspection an d preventive measures thus be taken at the workshop.

The measuring method according to the invention is based on the consideration that any individual measurement, for example measurement in the state immediately when starting the engine or when the vehicle is not level or if there is a long oil return time between engine on and engine off, etc., is subject to error. other objects, advantages and novel features of the present invention will become apparent from the following detailed description of the invention when considered in conjunction with the accompanying drawings.

BRIEF DESCRIPTION OF THE DRAWINGS

FIG. 4 shows a table of oil masses M.

DETAILED DESCRIPTION OF THE DRAWINGS

Referring to FIGS. 1 to 4, a measuring method is first described, which, by way of example, follows the steps set out herein.

When a specific driving/operating state, for which conditions are to be satisfied, such as operating times, oil temperature, etc. (see FIG. 3), is fulfilled (step 300), an instantaneous oil mass xmom is generated (step 301) from a characteristic map (oil mass=f(level and engine speed)) by means of the instantaneously measured oil level after a level correction with regard to the oil temperature.

By forming an average value from, for example, thirty (30) instantaneous oil masses xmom, an $\overline{X}_z$ oil mass is generated (step 302), which has far-reaching statistical reliability in terms of the oil quantity actually in the engine.

Figure 2:
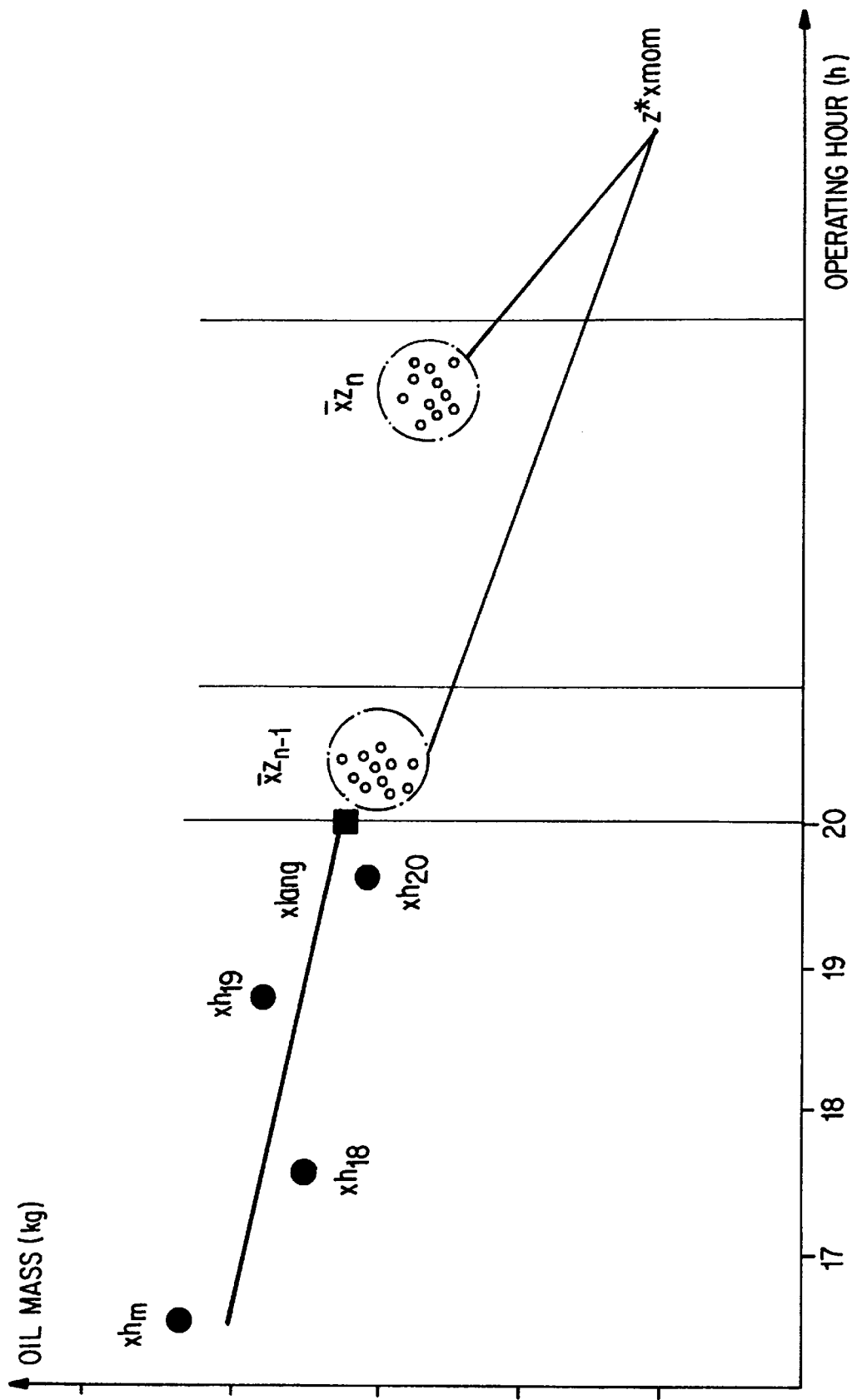
FIG. 2 shows a diagrammatic illustration of the oil masses used, plotted against the operating-hour axis.

Referring to FIG. 2, after an operating hour has elapsed, an hourly oil mass xh is generated by the formation of the weighted average value from the $\overline{X}_z$ oil masses occurring until then and from the remaining instantaneous values xmom. In this case, an operating hour is deemed to be sixty (60) consecutive minutes during which the specific operating conditions prevail.

By means of a suitable mathematical method for describing the variation in an oil mass xh over time, such as, for example, linear regression, an oil mass sufficiently verified statistically (the so-called long-term oil mass xlang, here the last point on the straight line of regression, including the associated kilometer count), is generated after each operating hour has elapsed. This oil mass is generated from a sufficient number of, for example the ten (10) most current, hourly oil masses xh. This value describes, as a rule very accurately, the oil mass in the engine at a specific time.

In parallel with this long-term oil mass xlang determined after each operating hour, the two $\overline{X}_z$ values which are the most current in each case, namely $\overline{X}_{zN-1}$ and $\overline{X}_{zn}$, which are formed from the most current instantaneous oil masses, are permanently incorporated in the program calculation.

Oil top-ups which have occurred are generally recognized or determined by an interrogation of conditions and a subsequent calculation.

At the same time, the method discriminates between the normal case and special cases which may occur randomly in practice:

a) A normal case means that the long-term oil mass xlang determined arithmetically from the measured oil levels corresponds in actual fact to the oil mass in the engine. To determine whether a normal case is occurring, a difference DFA is calculated (step 303) from the end point xlang, from the compensating function or straight line of regression describing the variation in an oil mass xh over time and from the oil-mass average value penultimate in time, according to the function (DFA= xlang-$\overline{X}_{zN-1}$), with $\overline{X}_{zN-1}$ being the oil mass penultimately obtained by rolling averaging from z instantaneous oil masses xmom. A plausibility check is then conducted, which determines whether the difference DFA is greater than a first oil-mass limit value M1 (step 304). If the difference DFA is smaller than the oil-mass limit value M1, or smaller than the limit value M2 (step 305) if events have additionally occurred during the period prior to recognition, a normal case is recognized. The oil-mass limit value M1 is higher than the oil-mass limit value M2, M1 preferably being 0.4 kg and M2 preferably being 0.2 kg.

b) If the difference DFA is greater than the oil-mass limit values M1 or M2, and if there are conditions additionally to be defined, such as "Driver was instructed to top up oil", "Oil warning lamp went on", or the like, a special case is recognized (steps 306 and 307) and a processing function is started in order to calculate the oil top-up quantity in the special case. A special case means that, as a result of excessive oil consumption or damage or due to the rapid evaporation of the readily boiling foreign liquid fractions, such as water or fuel, in the engine oil, substantially less liquid or oil was in the engine in the very recent past than the long-term oil mass xlang describes on the basis of statistical determination.

If a special case is occurring, this has effects on the method of recognition/calculation to be employed.

A special case S1 (see FIG. 3, step 306) is determined by establishing a "suspected" deviation of the penultimate $\overline{X}_z$ value from the long-term oil mass xlang which is greater than M1. If a top-up becomes probable here as a result of a sufficient difference DS between the last two $\overline{X}_z$ values (step 308), while at the same time there is a low spread/standard deviation of the instantaneous oil masses within the most current $\overline{X}_z$ oil mass, the top-up quantity is determined as follows: Top-up quantity [liters]=($\overline{X}_{zn}$-$\overline{X}_{zN-1}$) x oil density (constant) (step 310)

If no special case S1 is occurring, a check is made as to whether the conditions for a special case S2, namely that the difference DFA is greater than M2 and additional events, such as a warning to the driver or a "top-up oil" request, occur within a specific period of time, are fulfilled (step 307).

At the same time, a deviation, lower in comparison with the special case S1, between the penultimate $\overline{X}_z$ value and the long-term oil mass, in conjunction, for example, with an oil-level warning on an instrument cluster, is used for recognition and interrogation. As a result of the warning on the instrument cluster, a subsequent oil top-up by the driver is to be considered as probable.

If the condition for S2 is satisfied, the further procedure is the same as in the special case S1.

If neither of the special cases S1 or S2 is occurring, then it is highly probable that there is no relevant deviation, caused, for example, by evaporation, engine damage, etc., between the long-term oil mass and the oil mass which is actually in the engine.

The oil top-up for the normal case is then calculated, according to the definition of the difference DNF= $\overline{X}_{zN}$-xlang (step 320), as Top-up quantity [liters]=($\overline{X}_{zn}$-xlang)×oil density (constant). (step 315)

If special cases are recognized, the result of the top-up quantity calculation is valid only if it has been possible to determine a fixed minimum top-up, for example 0.5 l. Values below such a limit value, which is to be fixed in any case, are classified as unreliable and are discarded.

For this purpose, in a reliability interrogation, the difference DS is recognized as valid, according to the function (DS=$X_{zn}$-$\overline{X}_{zn-1}$), when it is greater than an oil-mass limit value M4 and the standard deviation s$\overline{X}_{zn}$ of the most current oil-mass average value $\overline{X}_{zn}$ is below a predetermined oil-mass limit value M3 (step 309). In the present example, M3 is 0.18 kg and M4 is 0.55 kg.

As a reliability interrogation for the normal case, a check is made as to whether the difference DNF is greater than an oil-mass limit value M5 which may be 0.44 kg and which, in any case, is lower than M4 (step 311).

Figure 1:
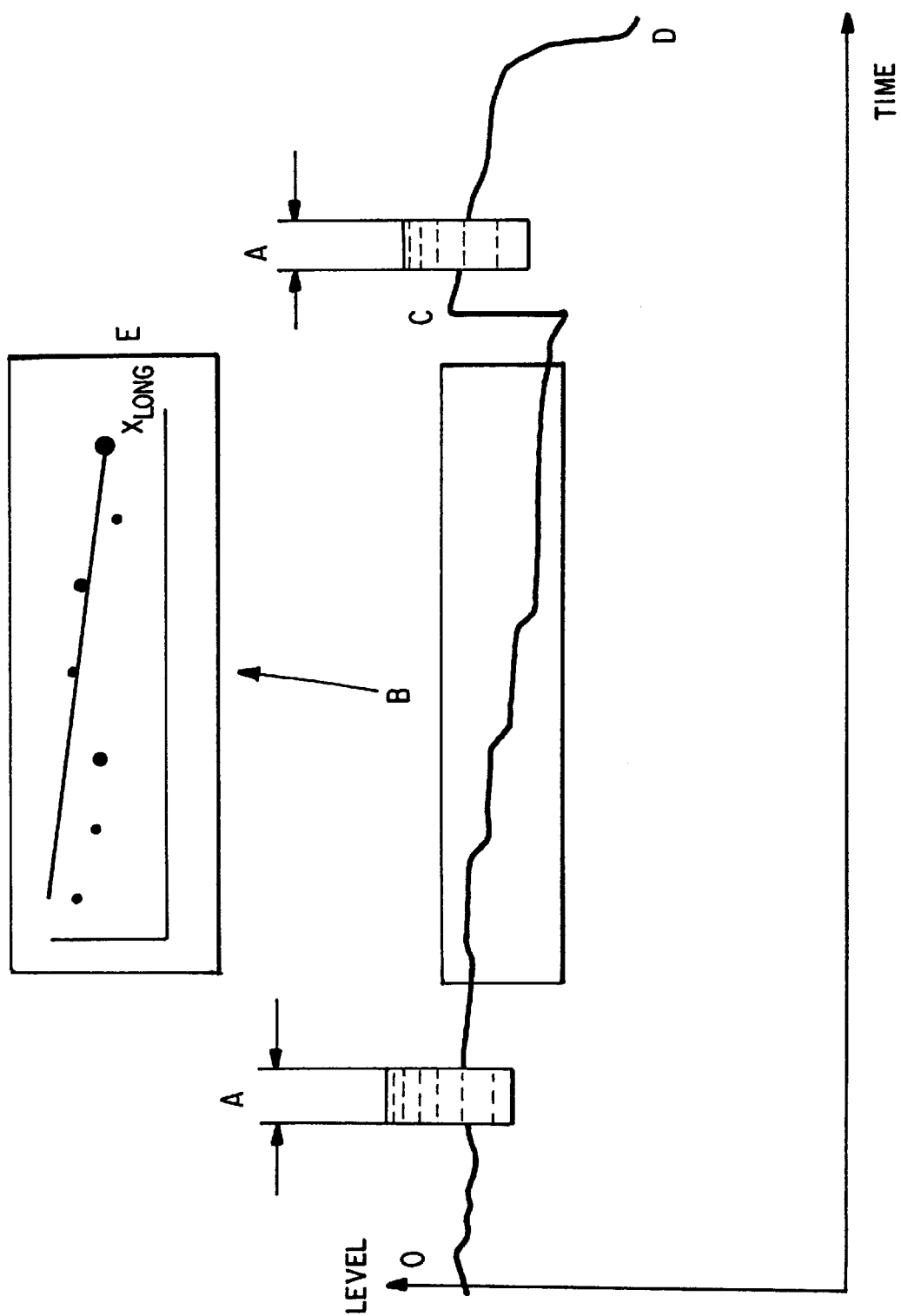
FIG. 1 shows an illustration of the oil-level profile during engine operation, including an oil top-up.

Referring particularly to the individual figures, FIG. 1 illustrates the level profile in the oil sump of an engine during its operating phase. In the left-hand region, 0 represents the state when the vehicle is delivered. The points A show diagrammatically the current level on the basis of a 1-hour measurement for determining the mass. The window B shows a rolling distance consumption window over an interval of 10 hours on the basis of determined oil masses and a statistical weighing of the distribution. Shown above this, in the window E, is the calculation of the distance oil consumption, with the individual statistical measuring points which lead to the straight line of regression, with the end point of the straight line of regression being represented by a cross. The time point C shows an oil top-up situation which is represented by a jump function. A rapid oil loss, leading to a driver's warning, is shown at D at the right-hand edge of the figure.

FIG. 2 shows the oil masses on which the method according to the invention is based.

a) The value xmom is the instantaneously detected oil mass on the basis of the fundamental operating conditions, characteristic lines, characteristic maps and correcting functions.

b) The value $xh_m$ is the oil-mass average value in relation to the mth operating hour, generated from all the xz and/or xmom within an operating hour.

c) The value xlang is the end point of the, if appropriately weighted, straight line of regression over m operating hours.

d) The value $\overline{X}_{zn-1}$ is the penultimate oil mass obtained by rolling averaging from z instantaneous oil masses xmom without reference to the operating hour.

e) The value $\overline{X}_{zn}$ is the last oil mass obtained by rolling averaging from z instantaneous oil masses xmom without reference to the operating hour.

Figure 3:
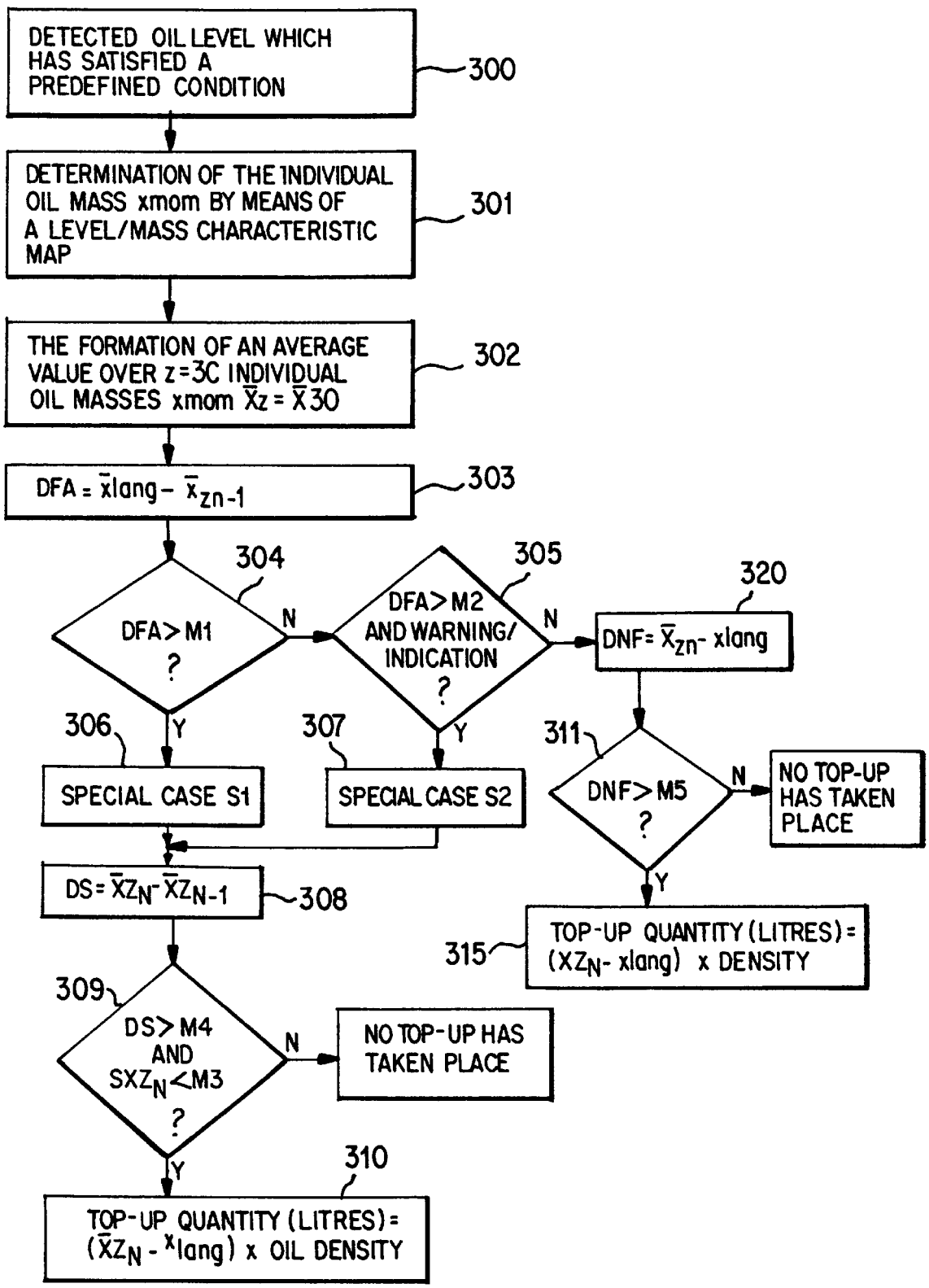
FIG. 3 shows a program flow chart by way of example.

Referring particularly to FIG. 3, this shows a flow chart by way of example for establishing an oil top-up. The program steps referred to in the flow chart and described herein can be implemented as a software program, a hardwired circuit, or some combination thereof. In particular, the program steps can be performed on a microprocessor already present in the motor vehicle, for example, the conventional engine control unit (ECU). It is readily understood that one skilled in the art can provide the relevant program code in accordance with the teachings contained herein. Such code would, for example, be stored in a memory contained in the vehicle such as RAM or ROM memory for example. Of course, the program code stored on a computer readable medium can be made separately available for use with engine control units in order to perform the method according to the present invention.

Referring to FIG. 4, there is shown a table for the variables M1–M5 giving their meanings and exemplary data values.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for recognizing oil top-up quantities in an engine, the method comprising the steps of:
   a) recording a multiplicity of oil levels under specific operating conditions over time;
   b) calculating an oil-mass average value $\overline{X}_z$ of the oil top-up quantity over z instantaneous measurements xmom in each case;
   c) calculating a compensating function, describing a variation in an oil mass xh over time, using a specific number of hourly oil masses xh;
   d) calculating a difference value DFA from an end point xlang of said compensating function and from a penultimate oil-mass average value according to a function (DFA=xlang-$\overline{X}_{zN-1}$), with $\overline{X}_{zN-1}$ being an oil mass penultimately obtained by rolling averaging from z instantaneous oil masses xmom;
   e) activating a discrimination function for checking whether said difference value DFA is greater than a first oil-mass limit value M1; and if so, a first case is recognized and a processing function for calculating the oil top-up quantity in the first case is started; and if not, a further discrimination function is activated, for checking whether the difference value DFA is greater than a second oil-mass limit value M2 and for checking if there is a specific communication signal between the vehicle and driver such that if a result of the check is that the difference value DFA is greater than the second oil-mass limit value M2 and there is a specific communication signal between the vehicle and driver, a second case is recognized and the processing function for calculating the oil top-up quantity in the second case is started, and if the result is negative, a processing function for calculating the oil top-up quantity in a normal case is activated.

2. The method according to claim 1, wherein to calculate the oil top-up quantity in the normal case, the method comprises the step of forming the difference value DNF according to the function (DNF=$\overline{X}_{zN}$-xlang) from a most current oil-mass average value $\overline{X}_{zN}$ and an end point xlang of the compensating function describing the variation in the oil mass xh over time.

3. The method according to claim 2, wherein in a reliabilty interrogation, the method includes the step of recognizing the difference DNF as valid if it is greater than a further oil-mass limit value M5.

4. The method according to claim 1, wherein to calculate the oil top-up quantity in either the first or second case, a difference DS is formed according to the function (DS=$\overline{X}_{zN}$-$\overline{X}_{zN-1}$).

5. The method according to claim 4, wherein in a reliability interrogation, the method includes the step of recognizing the difference DS as valid if it is greater than a further oil-mass limit value M4 and a most current oil-mass average value $\overline{X}_{zN}$ fulfills a predeterminable quality as regards a distribution of fundamental individual values xmom.

6. The method according to claim 5, wherein the most current oil-mass average value $\overline{X}_{zN}$ has a standard deviation $s\overline{X}_{zN}$ lower than a predetermined oil-mass limit value M3, which represents a statistical limit value for describing the spread.

7. The method according to claim 1, wherein the compensating function represents a straight line of regression.

8. The method according to claim 1, wherein the number z of measurements for forming an average value $\overline{X}_z$ of the oil quantity is between 10 and 60 measurements.

9. The method according to claim 8, wherein the number Z of measurements is thirty.

10. The method according to claim 1, wherein the number of instantaneous measurements xmom is variable, a time interval T, in which the measurements are carried out, being predetermined.

11. The method according to claim 10, wherein the predetermined time interval T is 20 to 120 minutes.

12. The method according to claim 11, wherein the predetermined time interval is 60 minutes.

13. The method according to claim 1, wherein the oil-mass limit value M1 is higher than the oil-mass limit value M2 and the oil-mass limit value M4 is higher than the oil-mass limit value M5.

14. The method according to claim 13, wherein: $M_1$=0.4 kg and/or; $M_2$=0.2 kg and/or; $M_3$=0.18 kg and/or; $M_4$=0.55 kg and/or; $M_5$=0.44 kg.

15. A computer product, comprising:
   a computer readable medium having stored thereon a program for recognizing oil top-up quantities in an engine, said program including code segments that:
   a) record a multiplicity of oil levels under specific operating conditions over time;
   b) calculate an oil-mass average value $\overline{X}_z$ of the oil top-up quantity over z instantaneous measurements xmom in each case;
   c) calculate a compensating function, describing a variation in an oil mass xh over time, using a specific number of hourly oil masses xh;
   d) calculate a difference value DFA from an end point xlang of said compensating function and from a penultimate oil-mass average value according to a function (DFA=xlang-$\overline{X}_{zN-1}$), with $\overline{X}_{zN-1}$ being an oil mass pen ultimately obtained by rolling averaging from z instantaneous oil masses xmom;
   e) activate a discrimination function for checking whether said difference value DFA is greater than a first oil-mass limit value M1; and if so, a first case is recognized and a processing function for calculating the oil top-up quantity in the first case is started; and if not, a further discrimination function is activated, for checking whether the difference value DFA is greater than a second oil-mass limit value M2 and for checking if there is a specific communication signal between the vehicle and driver such that if a result of the check is that the difference value DFA is greater than the second oil-mass limit value M2 and there is a specific communication signal between the vehicle and driver, a second case is recognized and the processing function for calculating the oil top-up quantity in the second case is started, and if the result is negative, a processing function for calculating the oil top-up quantity in a normal case is activated.

16. The computer product according to claim 15, wherein the program include's code segments to calculate the oil top-up quantity in the normal case by forming the difference value DNF according to the function ($DNF=\overline{X}_{zN}-\text{xlang}$) from a most current oil-mass average value $\overline{X}_{zN}$ and an end point xlang of the compensating function describing the variation in the oil mass xh over time.

17. The computer product according to claim 16, wherein the program includes code segments, which, in a reliabilty interrogation, recognize the difference DNF as valid if it is greater than a further oil-mass limit value M5.

* * * * *